(12) United States Patent
Garnier et al.

(10) Patent No.: US 12,011,967 B2
(45) Date of Patent: Jun. 18, 2024

(54) HEAT EXCHANGER MODULE FOR A MOTOR VEHICLE

(71) Applicant: Valeo Systemes Thermiques, Le Mesnil Saint Denis (FR)

(72) Inventors: Sébastien Garnier, Le Mesnil Saint Denis (FR); Michael Lissner, Le Mesnil Saint Denis (FR); Amrid Mammeri, Le Mesnil Saint Denis (FR); Kamel Azzouz, Le Mesnil Saint Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 571 days.

(21) Appl. No.: 17/276,673

(22) PCT Filed: Sep. 13, 2019

(86) PCT No.: PCT/FR2019/052127
§ 371 (c)(1),
(2) Date: Mar. 16, 2021

(87) PCT Pub. No.: WO2020/058610
PCT Pub. Date: Mar. 26, 2020

(65) Prior Publication Data
US 2022/0041034 A1    Feb. 10, 2022

(30) Foreign Application Priority Data

Sep. 17, 2018 (FR) .......................... 1858371

(51) Int. Cl.
*B60H 1/00* (2006.01)
*B60K 11/06* (2006.01)
*B60K 11/08* (2006.01)

(52) U.S. Cl.
CPC .......... *B60H 1/00328* (2013.01); *B60K 11/06* (2013.01); *B60K 11/08* (2013.01); *B60K 11/085* (2013.01)

(58) Field of Classification Search
CPC .... B60H 1/00328; B60K 11/06; B60K 11/08; B60K 11/085; Y02B 30/56; Y02T 10/88; B60Y 2400/89
See application file for complete search history.

(56) References Cited

U.S. PATENT DOCUMENTS 4,519,343 A * 5/1985 Hayashi ............... F01P 5/06
123/41.65
5,588,482 A * 12/1996 Holka ................ B60K 11/08
165/44

(Continued)

FOREIGN PATENT DOCUMENTS

CN         1853971 A    11/2006
CN       102574459 A     7/2012

(Continued)

OTHER PUBLICATIONS

Translated DE-102017203858-A1 (Year: 2023).*
(Continued)

*Primary Examiner* — James A Shriver, II
*Assistant Examiner* — Ian Bryce Shelton
(74) *Attorney, Agent, or Firm* — Osha Bergman Watanabe & Burton LLP

(57) ABSTRACT

A heat exchange module includes at least a first heat exchanger and a ventilation device intended to generate a flow of air. The ventilation device includes at least one cross-flow fan for setting in motion an air flow and a guide means that includes at least one air guiding element for guiding the air set in motion by the cross-flow fan. The first heat exchanger and the ventilation device are positioned relative to one another in such a way that the air flow set in
(Continued)

motion by the ventilation device is fed into the heat exchanger and, when the fan is in operation, this air is drawn in by the cross-flow fan passes through the heat exchanger before entering the cross-flow fan.

11 Claims, 8 Drawing Sheets

(56) References Cited

U.S. PATENT DOCUMENTS

| | | | | |
|---|---|---|---|---|
| 10,071,625 | B1* | 9/2018 | Stoddard | B60K 11/085 |
| 2002/0038698 | A1* | 4/2002 | Kwon | B60H 1/00328 |
| | | | | 165/41 |
| 2011/0005732 | A1* | 1/2011 | Seto | F28F 9/0207 |
| | | | | 165/121 |
| 2011/0138850 | A1* | 6/2011 | Suzuki | F28F 21/06 |
| | | | | 165/151 |
| 2012/0241128 | A1* | 9/2012 | Vacca | B60K 11/085 |
| | | | | 165/44 |
| 2012/0325433 | A1* | 12/2012 | Hoppen | B60H 1/00542 |
| | | | | 165/67 |
| 2014/0039765 | A1* | 2/2014 | Charnesky | B60K 11/085 |
| | | | | 701/49 |
| 2016/0375744 | A1* | 12/2016 | Kakizaki | B60H 1/00328 |
| | | | | 62/160 |
| 2018/0370348 | A1* | 12/2018 | Takeuchi | F01P 3/18 |
| 2019/0001809 | A1* | 1/2019 | Fujitani | B60K 11/085 |
| 2019/0143785 | A1* | 5/2019 | Tilbury | B60H 1/00764 |
| | | | | 165/271 |
| 2019/0193529 | A1* | 6/2019 | Lechat | B05B 17/0615 |
| 2020/0023728 | A1* | 1/2020 | Dill | B60K 11/085 |

FOREIGN PATENT DOCUMENTS

| | | | | |
|---|---|---|---|---|
| CN | 103167965 | A | 6/2013 | |
| CN | 104802616 | A * | 7/2015 | |
| CN | 205768628 | U | 12/2016 | |
| CN | 107304737 | A | 10/2017 | |
| CN | 108297678 | A | 7/2018 | |
| DE | 102015113544 | A1 * | 2/2017 | ......... B60H 1/00328 |
| DE | 102017203858 | A1 * | 9/2018 | |
| DE | 102017203858 | A1 | 9/2018 | |
| EP | 1074419 | A2 | 2/2001 | |
| EP | 1715157 | A1 | 10/2006 | |
| EP | 1715157 | A1 * | 10/2006 | ........... B60K 11/085 |
| FR | 3050404 | A1 | 10/2017 | |
| FR | 3050404 | A1 * | 10/2017 | ............. B60K 11/06 |
| JP | 61153426 | A * | 7/1986 | |
| JP | S61-153426 | A | 7/1986 | |
| JP | 2008-190451 | A | 8/2008 | |
| JP | 2008190451 | A * | 8/2008 | |
| JP | 20120058952 | A * | 6/2012 | |
| JP | 2013-505873 | A | 2/2013 | |
| JP | 2013227939 | A * | 11/2013 | ............. B60K 11/06 |
| JP | 2014118103 | A * | 6/2014 | ............. B60K 11/04 |
| JP | 2015001155 | A * | 1/2015 | ............. B60K 11/04 |
| WO | WO-2017098765 | A1 * | 6/2017 | ............. B60K 11/04 |

OTHER PUBLICATIONS

Translated JP-61153426-A (Year: 2023).*
Translated FR-3050404-A1 (Year: 2032).*
Notification of Reason for Rejection in corresponding Japanese Application No. 2021-514508, dated Jul. 15, 2022 (7 pages).
International Search Report with Written Opinion in corresponding International Application No. PCT/FR2019/052127, dated Jan. 20, 2020 (13 pages).
First Office Action in corresponding Chinese Application No. 201980070612.9, dated Oct. 27, 2023 (13 pages).

* cited by examiner

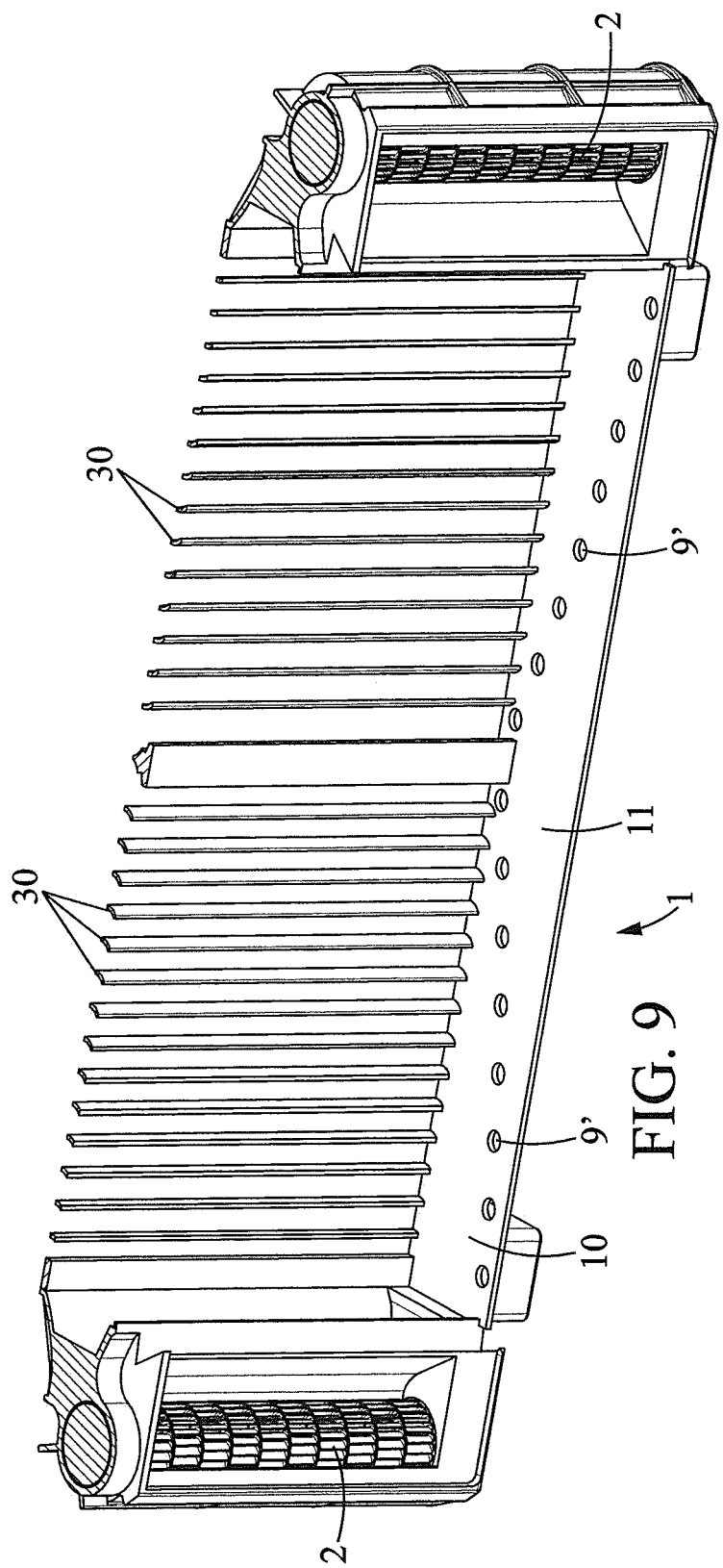
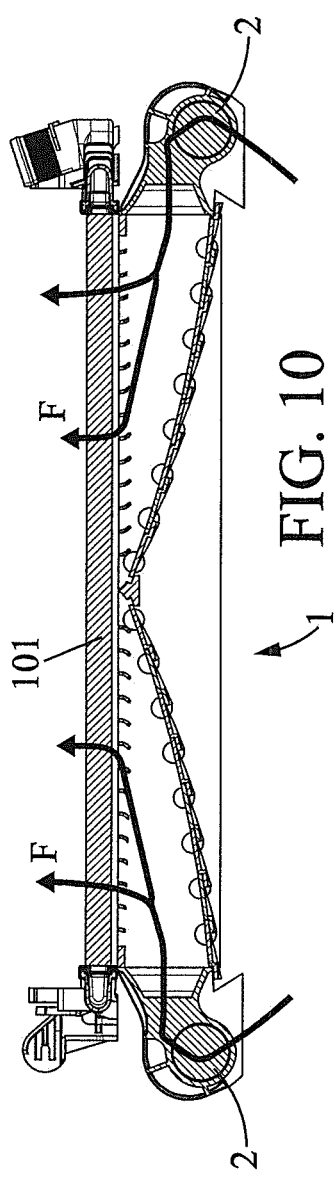
FIG. 9
FIG. 10

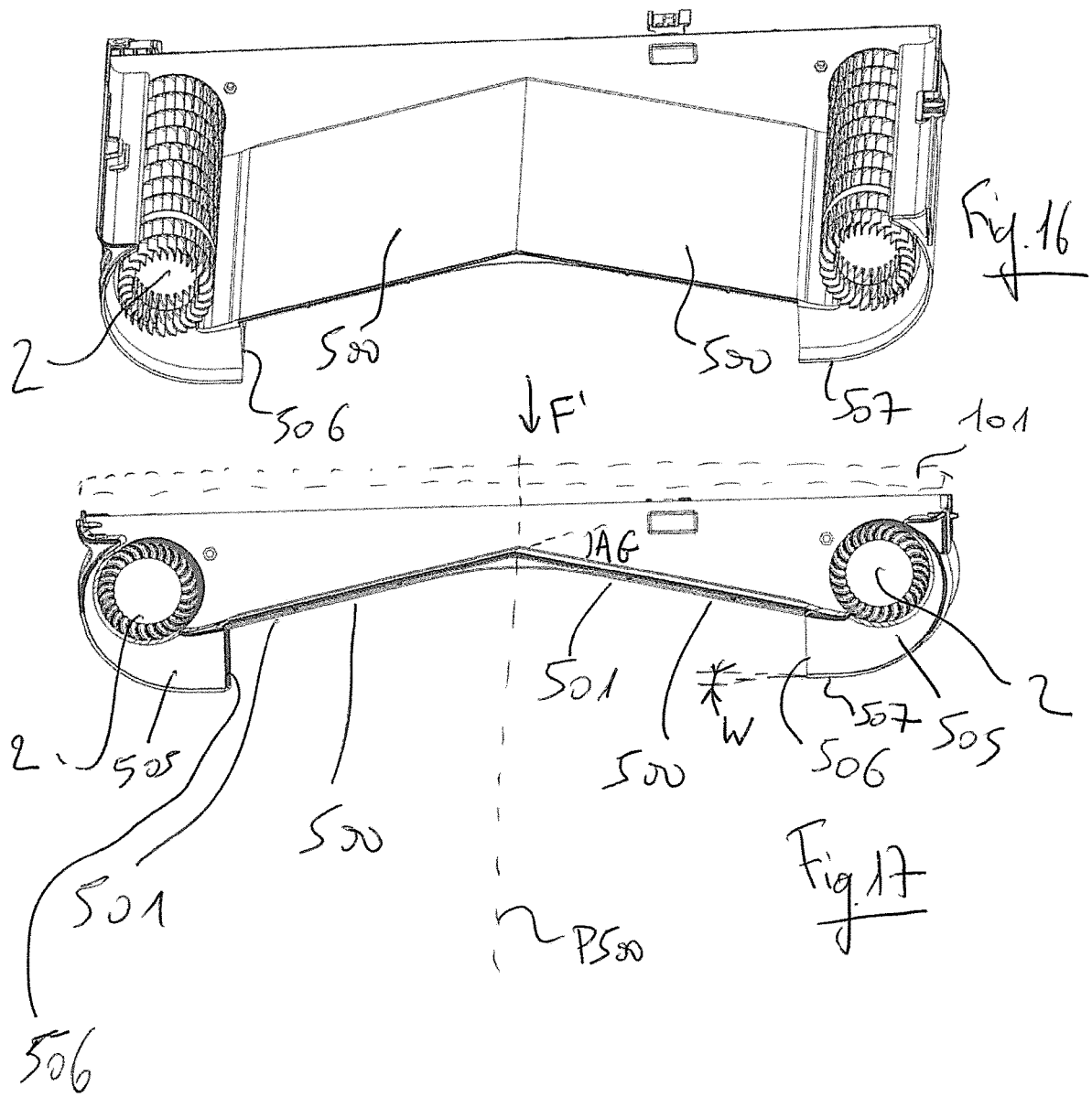

HEAT EXCHANGER MODULE FOR A MOTOR VEHICLE

The invention concerns a ventilation device for a motor vehicle.

The invention relates to the field of motor vehicles, and more particularly to the field of air circulation for cooling the engine and its equipment.

Motor vehicles, whether of the combustion or electric type, have to discharge the heat generated by their operation, and are equipped with heat exchangers for this purpose. A motor vehicle heat exchanger usually comprises tubes in which a heat transfer fluid, notably a liquid such as water, is intended to circulate, and heat exchange elements connected to these tubes, often designated by the term "fins" or "spacers". The fins may be used to increase the exchange surface between the tubes and the ambient air.

However, in order to further increase the heat exchange between the heat transfer fluid and the ambient air, a ventilation device is commonly used in addition, to generate or increase an air flow directed toward the tubes and the fins.

In the known way, such a ventilation device comprises a blower-wheel fan.

The flow of air generated by the blades of such a fan is turbulent, notably because of the circular geometry of the blower wheel, and generally reaches only part of the surface of the heat exchanger (the circular region of the exchanger that faces the blower wheel of the fan). The exchange of heat is therefore not uniform across the entire surface of the tubes and of the fins.

Furthermore, when it is not necessary for the fan to be switched on (typically when the exchange of heat with non-accelerated ambient air is enough to cool the heat-transfer fluid circulating in the exchanger), the blades partially obstruct the flow of the ambient air toward the tubes and the fins, thus impeding the circulation of air toward the exchanger and thus limiting the exchange of heat with the heat-transfer fluid.

Such a fan is also relatively bulky, notably because of the necessary dimensions of the blower wheel in order to obtain effective engine cooling, and this makes integrating it into a motor vehicle a lengthy and tricky process.

This integration is all the more complicated in an electric vehicle, the front face of which leaves very little space in which to house the vehicle cooling elements.

The object of the invention is to overcome, at least partially, these drawbacks.

To this end, one subject of the invention is a ventilation device intended to generate a flow of air toward a motor vehicle heat exchanger, comprising at least:
 a cross-flow fan for setting in motion an air flow intended for the heat exchanger, and
 a guide means comprising at least one air guiding element configured to guide the air set in motion by the cross-flow fan toward the heat exchanger.

Thus, the ventilation device according to the present invention, having no blower wheel, is smaller in bulk, allowing easy integration into any motor vehicle, including electric vehicles.

What is more, by virtue of the cross-flow fan and the guide means, the ventilation device according to the present invention guarantees more uniform and effective cooling of the heat exchanger or of the heat exchangers with which it is associated.

The cross-flow fan may also be referred to as a cross-flow turbomachine.

According to another feature of the invention, the device comprises at least one air deflector configured to be positioned between said at least one guiding element and the heat exchanger.

According to another feature of the invention, the device comprises a plurality of air deflectors aligned with, and preferably equidistant from, one another.

According to another feature of the invention, the device comprises a plurality of air guiding elements.

According to another feature of the invention, the air guiding elements are configured to delimit at least one air passage in the heat exchanger and are mounted with the ability to move between a position in which said air passage is open and a position in which said air passage is at least partially closed off.

In this way, the device is able not to block the flow of the ambient air toward the heat exchanger when the ventilation device is switched off, unlike a blower wheel of which the immobile blades and the motor at the center of the blower wheel obstruct the passage of air toward the exchanger, and thus limit the exchange of heat.

According to another feature of the invention, each air guiding element comprises an air guiding surface and a pivot axle for the guiding element.

According to another feature of the invention, the pivot axles extend parallel to one another, projections of each pivot axle in a plane orthogonal to the pivot axles being referred to as projections.

According to another feature of the invention, the projections are aligned in said plane orthogonal to the pivot axles.

According to another feature of the invention, the device comprises at least a first and a second cross-flow fan one on each side of the guiding elements, the cross-flow fans extending parallel to the guiding elements, a total cross section of the guiding elements having a median direction parallel to the guiding elements so as to delimit a first half section between the first fan and the median direction and a second half section between the second fan and the median direction, the guiding elements being configured so that a distance between the heat exchanger and one projection is less than a distance between the heat exchanger and the adjacent projection, situated in the same half section and closer to the associated turbomachine.

According to another feature of the invention, the device comprises a single fixed guiding element.

According to another feature of the invention, the device comprises an air inlet associated with each turbomachine, the inlet or inlets forming unique air inlets of the ventilation device.

According to another feature of the invention, at least one of said air inlets is equipped with at least one flap able to move between a position in which the inlet is open and a position in which the inlet is at least partially closed.

According to another feature of the invention, the at least one cross-flow fan is configured to extend along an opening of a radiator grille of the motor vehicle.

According to another feature of the invention, the at least one cross-flow fan is configured to occupy the entire volume of the opening of the radiator grille.

According to another feature of the invention, a component for leading an external air flow as far as the turbomachine may be used.

According to another feature of the invention, a second guide means comprising at least one guiding element that guides air toward a second heat exchanger of the motor vehicle may be used.

According to another feature of the invention, the two guide means are fed by the same cross-flow fan.

According to another feature of the invention, each of the guide means comprises a plurality of air guiding elements, each guiding element comprising an air guiding surface and a pivot axle of the guiding element, the pivot axles extending parallel to one another, the set of the two guide means exhibiting planar symmetry.

Another subject of the invention is a heat exchange module, comprising a ventilation device as described hereinabove and at least a first heat exchanger, the first heat exchanger and the ventilation device being positioned relative to one another in such a way that an air flow set in motion by the ventilation device feeds the heat exchanger with air.

According to another feature of the invention, the module further comprises a second heat exchanger, mounted facing the first heat exchanger, the ventilation device being positioned in such a way that an air flow set in motion by the ventilation device is fed into the first heat exchanger and the second heat exchanger.

According to another feature of the invention, the ventilation device is positioned between the first heat exchanger and the second heat exchanger.

Another subject of the invention is a heat exchange module, comprising at least a first heat exchanger, and a ventilation device intended to generate a flow of air, this ventilation device comprising at least one cross-flow fan for setting in motion an air flow and a guide means comprising at least one air guiding element configured to guide the air set in motion by the cross-flow fan, the first heat exchanger and the ventilation device being positioned relative to one another in such a way that an air flow set in motion by the ventilation device is fed into the heat exchanger and, when the fan is in operation, this air is drawn in by the fan and this drawn-in air passes first of all through the heat exchanger before entering the cross-flow fan.

Thus, the cross-flow fan or fans are positioned downstream, according to the direction in which the air flows, of the heat exchanger.

According to one of the aspects of the invention, the ventilation device comprises a plurality of air guiding elements.

According to one of the aspects of the invention, the air guiding elements are configured to delimit at least one air passage downstream of the heat exchanger and are mounted with the ability to move between a position in which said at least one air passage is open and a position in which said at least one air passage is at least partially closed off.

According to one of the aspects of the invention, each air guiding element comprises an air guiding surface and a pivot axle for the guiding element.

According to one of the aspects of the invention, the pivot axles extend parallel to one another, projections of each pivot axle in a plane orthogonal to the pivot axles being referred to as projections.

According to one of the aspects of the invention, the projections are aligned in said plane orthogonal to the pivot axles.

According to one of the aspects of the invention, the device comprises at least a first and a second cross-flow fan one on each side of the guiding elements.

According to one of the aspects of the invention, the module has no pivoting air guiding element facing the exchanger.

Throughout the embodiments of the invention which are described hereinabove, the pivoting guiding elements may be replaced by fixed guiding elements.

According to one of the aspects of the invention, the module has at least one fixed air guiding element placed facing the exchanger.

According to one of the aspects of the invention, the fixed air guiding element, notably of substantially planar shape, extends facing the exchanger, from a geometric plane centered on the exchanger, and preferably as far as the cross-flow fan.

According to one of the aspects of the invention, the module comprises two fixed air guiding elements extending facing the exchanger, from a geometric plane preferably centered on the exchanger, and on either side of this plane.

According to one of the aspects of the invention, each air guiding element extends as far as one of the cross-flow fans.

According to one of the aspects of the invention, the two fixed guiding elements are substantially planar, and form a non-zero angle between them. These elements are not aligned with respect to one another.

According to one of the aspects of the invention, the angle between the two planes is, for example, comprised between 0° and 45°, or between 0° and 15°.

According to one of the aspects of the invention, the fixed air guiding element comprises a plate fixed in the module.

According to one of the aspects of the invention, the plates are two separate components, or are produced as a single piece, for example using molding.

According to one of the aspects of the invention, whether this be for the suction fan or blower fan version, the module may comprise a discharge duct for each cross-flow fan, and this duct has an outlet substantially downstream of the air guiding element or elements.

According to one of the aspects of the invention, the discharge duct comprises an outlet wall adjacent to the discharge outlet, which outlet wall preferably makes, geometrically, with a main face of the exchanger, an angle W, the angle W being comprised between 0° and 110°.

This orientation of the discharge notably facilitates the ejection of the air.

According to one of the aspects of the invention, each cross-flow fan comprises a discharge duct and the respective discharge outlets face one another.

According to one of the aspects of the invention, the discharge outlet is positioned at the rear of the fixed or pivoting guiding element.

According to one of the aspects of the invention, the discharge outlets are symmetrical with respect to one another about a plane of symmetry, notably passing through the center of the exchanger.

Another subject of the invention is a radiator grille for a motor vehicle, the grille being provided with an opening and with a ventilation device as described hereinabove and/or a heat exchange module as described hereinabove.

Other features and advantages of the invention will become apparent on reading the following description. This description is purely illustrative and should be read in conjunction with the appended drawings, in which:

FIG. 9 is a partial perspective view of the module of FIG. 1, according to a variant embodiment, a guiding means not being depicted;

FIG. 10 is a view in longitudinal section of the module of FIG. 9;

FIGS. 16 and 17 illustrate two views of another exemplary embodiment of the invention.

VENTILATION DEVICE

Figure 2:
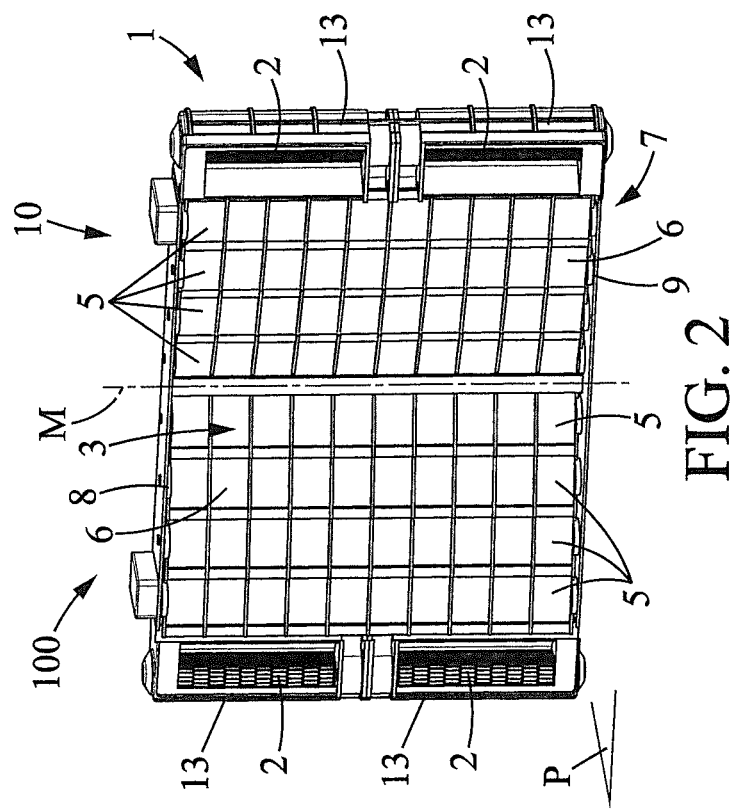
FIG. 2 is a perspective view of the heat exchange module of FIG. 1 in the closed position.

One subject of the invention is a ventilation device 1 for a motor vehicle.

Another subject of the invention is a heat exchange module 100, comprising at least one ventilation device 1 and at least one heat exchanger 101, as will be detailed later.

As is evident from the figures, the ventilation device 1 comprises at least one cross-flow fan, also referred to hereinafter as a cross-flow turbomachine, referenced 2, to set in motion a flow of air F intended for the heat exchanger or heat exchangers. Specifically, the ventilation device may feed air to the heat exchanger 101, but also to several heat exchangers arranged one behind the other, or one next to the other.

The ventilation device 1 also comprises a guide means 3 for guiding the air F into each of the heat exchangers that are to be cooled.

First Embodiment

According to the first embodiment, illustrated in FIGS. 1 to 8, the ventilation device 1 comprises a single guide means 3 for guiding the air toward at least one heat exchanger 101.

The guide means 3 comprises a set of a plurality of guiding elements 5.

As is particularly evident from FIGS. 1 to 4, each guiding element 5 comprises an air guiding surface 6 in the form of a panel and a pivot axle 7 for the guiding element 5.

The panel 6 has a substantially rectangular shape.

The pivot axle 7 comprises two aligned fingers 8, 9, each of the fingers 8, 9 projecting out from the panel 6 in a longitudinal direction of the panel 6.

The guiding elements 5 are mounted parallel to one another, and parallel to a median direction, referred to as direction of pivoting, denoted M.

Figure 1:
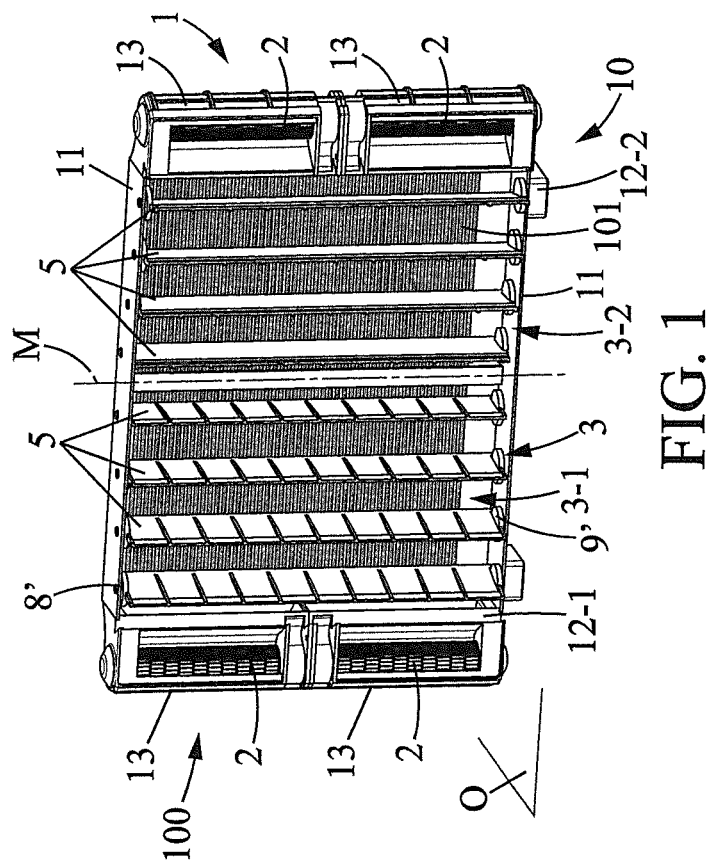
FIG. 1 is a perspective view of a heat exchange module equipped with a ventilation device according to a first embodiment of the present invention in the open position.

As is evident also from FIGS. 1 and 2, the ventilation device 1 comprises a frame 10.

The frame 10 has a substantially rectangular shape.

The frame 10 comprises two bars 11, for respectively supporting the fingers 8 and the fingers 9 of the guiding elements 5.

The bars 11 extend parallel to one another and orthogonal to the direction M.

The bars 11 form lengths of the rectangle 10.

The frame 10 also comprises two bars 12-1, 12-2 for supporting compartments 13.

The bars 12-1, 12-2 extend parallel to one another, and parallel to the direction M.

The bars 12-1, 12-2 form widths of the rectangle 10.

As can be seen in FIGS. 1 and 2, each bar 12-1, 12-2 supports two compartments 13 extending in the continuation of one another.

Each compartment 13 is configured to house a cross-flow turbomachine 2, or at least the cross-flow turbine of the turbomachine, it being possible for the turbine drive motor to be shared with a turbine of an adjacent compartment.

Two parts to the guide means 3 may be defined.

A first part 3-1 comprises the guiding elements 5 positioned between the first bar 12-1 and the median direction of pivoting M, and a second part 3-2 comprises the guiding elements 5 positioned between the second bar 12-2 and the median direction of pivoting M.

Figure 3:
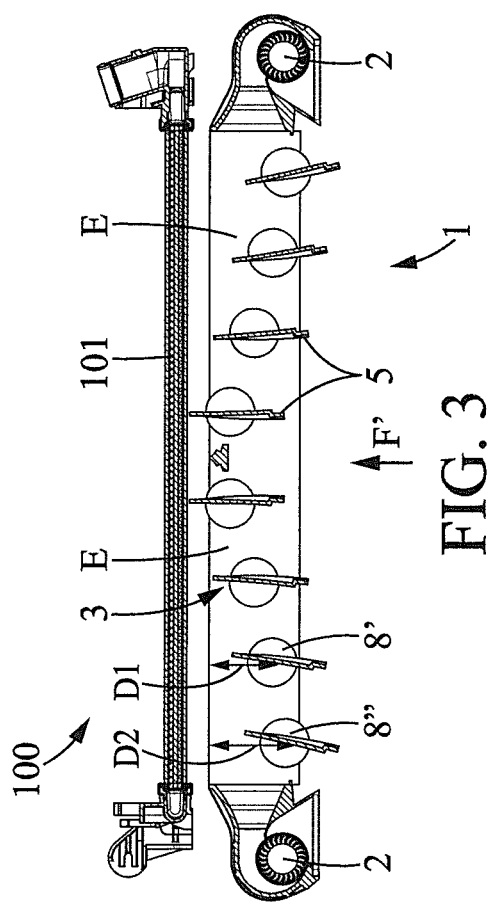
FIG. 3 is a view in longitudinal section of the module of FIG. 1.
Figure 4:
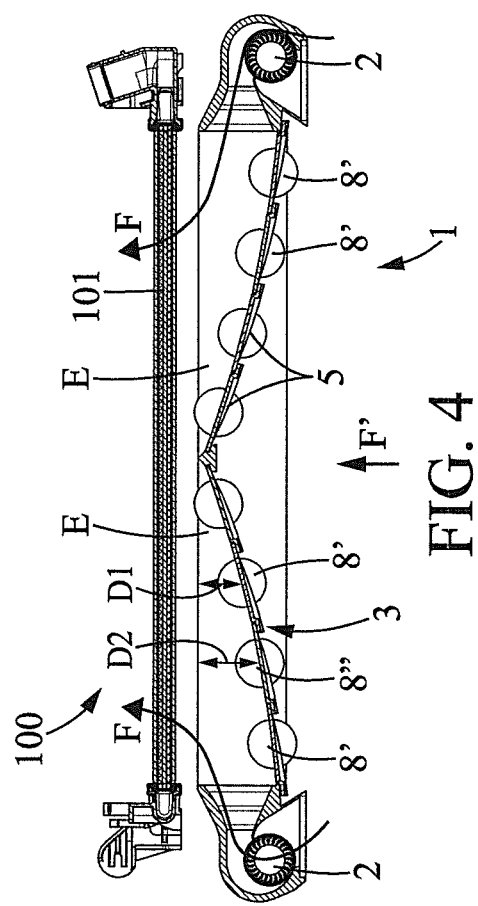
FIG. 4 is a view in longitudinal section of the module of FIG. 2.
Figure 5:
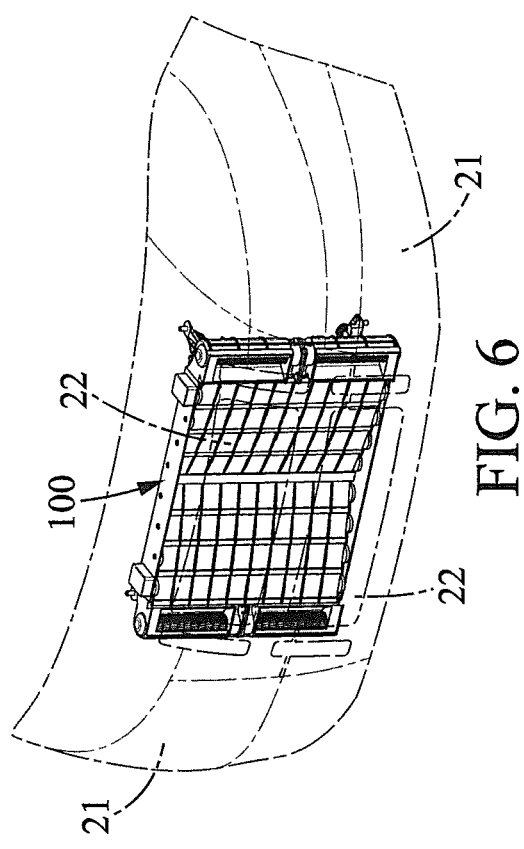
FIG. 5 is a perspective view of a front face of a motor vehicle equipped with the module of FIG. 1.
Figure 6:
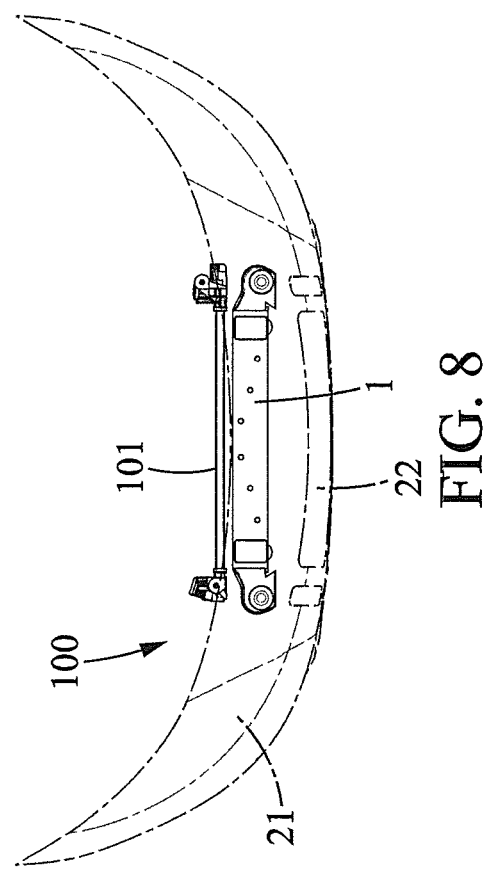
FIG. 6 is a perspective view of a front face of a motor vehicle equipped with the module of FIG. 2.
Figure 7:
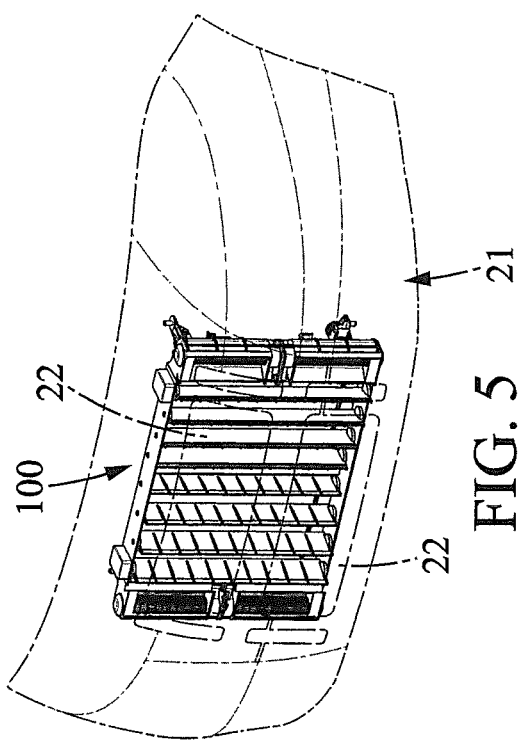
FIG. 7 is a side view of the front face of FIG. 5.
Figure 8:
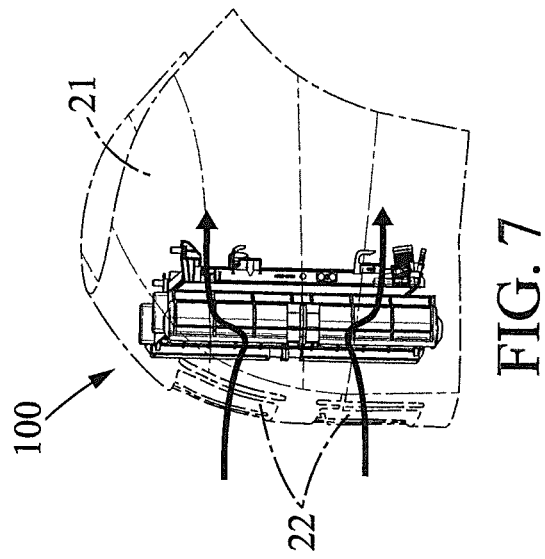
FIG. 8 is a view from above of the front face of FIG. 6.

As is more particularly visible in FIGS. 3 and 4, the fingers 8 (and, respectively, 9) are not aligned.

Their projections 8' (and, respectively, 9') in a plane, denoted O, orthogonal to the axis M, form a V.

The plane O substantially coincides with the plane formed by the support bar 11.

In other words, the guiding elements are positioned between the support bars 11 so that a distance D1 between the heat exchanger 101 and a given projection 8' (or 9') is less than a distance D2 between the heat exchanger 101 and the adjacent projection 8'', situated in the same half section 3-1 but closer to the associated cross-flow turbomachine.

This configuration ensures optimal guidance of the air because the air flow converges from the cross-flow turbomachine 2 into the heat exchanger 101.

Nevertheless, according to another variant, the projections may be aligned along the bars 11.

This variant, which is not as advantageous in terms of the flow of the air, potentially allows simplification of the method of manufacturing the ventilation device 1.

The frame 10 delimits an internal space forming the air inlet for air bound for the heat exchanger 101. Within this internal space, the guiding elements delimit air passages E toward the heat exchanger 101.

The guiding elements are mounted with the ability to move between a position in which the air passage E is open and a position in which the air passage E is at least partially closed off.

In the open position, the panels are spaced apart from one another so as to allow an air flow F' external to the exchange module to pass toward the heat exchanger 101.

In the closed-off position, also referred to as the closed position, the panels 6 extend in the continuation of one another so as to prevent the air flow F' from passing through the heat exchanger 101.

In this position, the panels 6 are advantageously contiguous with one another by means of a lip arranged along their edge.

In another possible intermediate position (not depicted in the figures), the guiding elements partially close off the air passage E, allowing the flow rate of air to the heat exchanger 101 to be reduced, for example when the demand for cooling of the heat exchanger 101 is not high.

As visible in FIG. 3, in the open position, the flow F' external to the vehicle passes through the ventilation device 1 as far as into the heat exchanger 101.

The turbomachines 2 are preferably not running.

As visible in FIG. 4, in the closed position, the panels 6 block the air passage E to the air flow F'.

The turbomachines then operate and blow the air flow F, which is then guided by the guiding elements 5, as far as into the heat exchanger 101.

Because of the convergent shape of the guide means 3, the air is optimally led toward the heat exchanger 101.

FIGS. 5 to 8 illustrate an example of the integration of the ventilation device 1 into a front face 20 of a motor vehicle.

As visible in these figures, a radiator grill 21 is equipped with two orifices 22, forming an inlet opening for the air F'.

The ventilation device 1 is positioned behind the orifices 22.

In these figures, the ventilation device 1 is in accordance with the ventilation device 1 already described in connection with FIGS. 1 to 4.

Variant Embodiment of the Invention

According to the variant of FIGS. 9 and 10, the ventilation device 1 comprises a guide means 3 as illustrated in FIGS. 1 to 4 (for the sake of clarity, it is not depicted in FIGS. 9 and 10, these being a partial view of the module of FIG. 1), a frame 10, and cross-flow turbomachines 2 in a configuration similar to that of the first embodiment.

The ventilation device 1 additionally comprises at least one deflector between the guide means 3 (not depicted) and the heat exchanger 101.

The deflector or deflectors provide better distribution of the air across the heat exchanger 101, allowing a more uniform distribution of the air flow F in the heat exchanger 101.

In FIGS. 9 and 10, the ventilation device 1 comprises a plurality of deflectors 30.

Each deflector 30 is a rod of which a transverse section is curved in such a way as to guide the air.

The deflectors 30 are aligned along the support bars 11, preferably equidistant from one another, as is more particularly visible in FIG. 10.

In the open position, the air F blown by the turbomachines 2 is guided toward the exchanger 101 by the guide means 3 and then by the deflectors 30.

Note that the device 1 in this variant embodiment provides better uniformity of the air bound for the heat exchangers 101, by way of the deflectors.

Note too that FIG. 9 depicts a plurality of orifices 31, each orifice 31 being intended to accept a finger 9' of the guiding elements 5.

Second Embodiment

Figure 11:
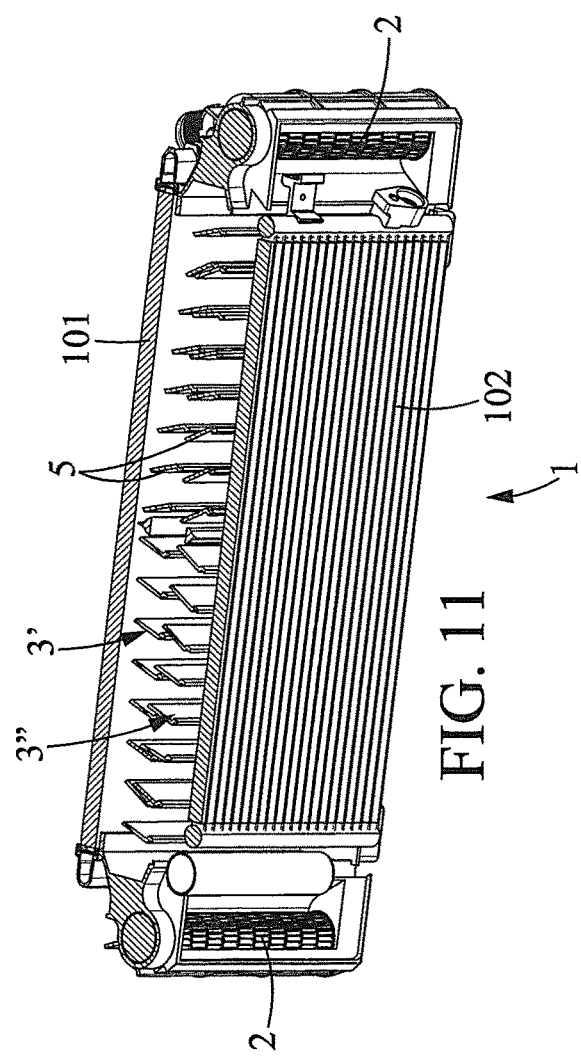
FIG. 11 is a partial perspective view of a heat exchange module equipped with a ventilation device according to a second embodiment of the present invention in the open position.
Figure 12:
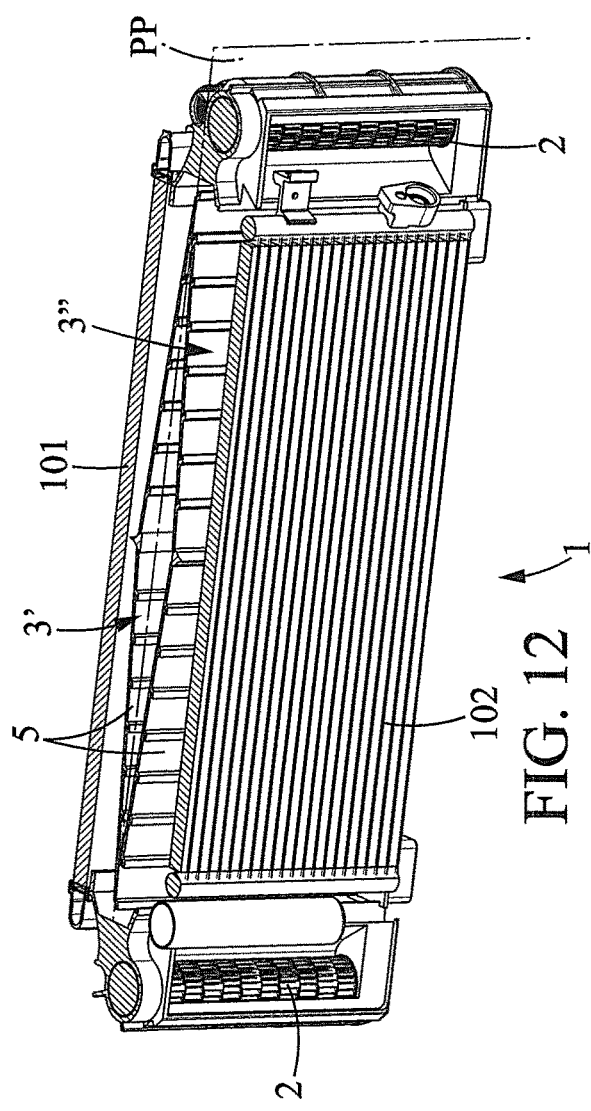
FIG. 12 is a partial perspective view of the module of FIG. 11 in the closed position.

According to the second embodiment illustrated in FIGS. 11 and 12, the ventilation device 1 comprises two guide means 3', 3".

The first guide means 3' is able to direct the air onto a first heat exchanger 101, while the second guide means 3" is able to direct the air toward a second heat exchanger 102.

As is evident from FIGS. 11 and 12, the ventilation device 1 is positioned between the two exchangers 101, 102 extending parallel to each other.

Each of the guide means 3', 3" comprises guiding elements identical to those described in connection with the first embodiment.

As is evident from FIGS. 11 and 12, the pivot axles 7 of the two guide means 3 extend parallel to the median direction of pivoting M.

The set of the two guide means 3', 3" exhibits symmetry with respect to a plane PP.

The plane PP has a direction parallel to the median direction M.

The device 1 is in other respects identical to the one described in connection with the first embodiment.

As visible in FIGS. 11 and 12, the two guide means 3', 3" are fed from the same turbomachines 2.

Note that the device 1 according to this second embodiment may thus advantageously comprise deflectors 30 (not depicted in FIGS. 11 and 12) between each of the guide means 3' and 3" and the first and second exchangers 101, 102 respectively, in order to achieve better uniformity of the air bound for the heat exchangers 101 and 102.

Third Embodiment

According to a third embodiment, the ventilation device 1 comprises a single guide means 3 comprising a single guiding element 5.

Figure 13:
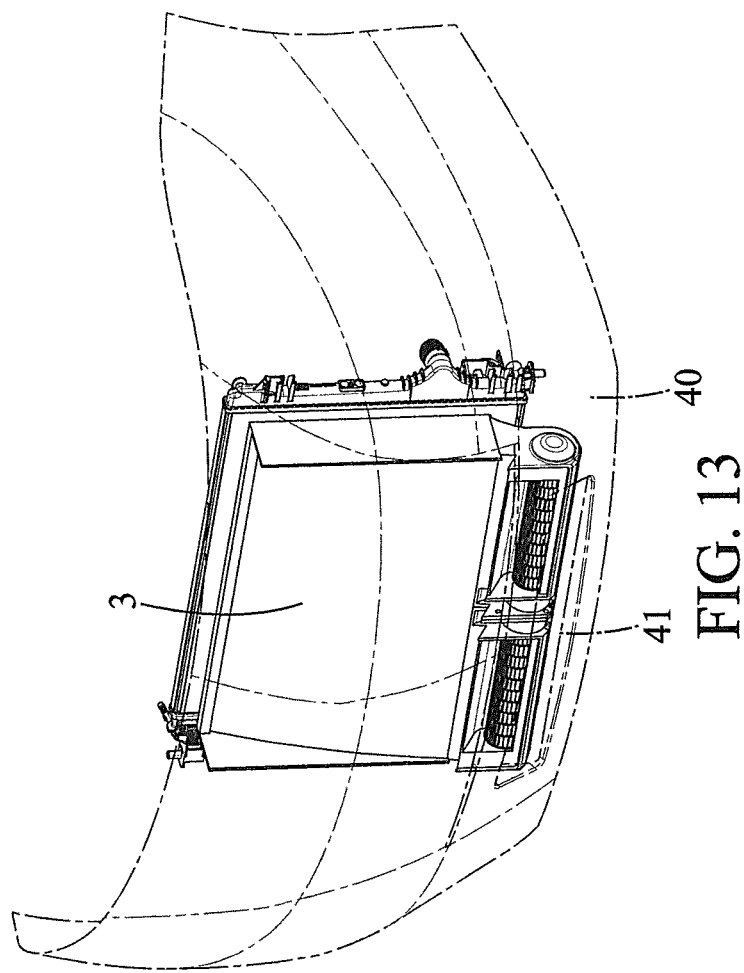
FIG. 13 is a perspective view of a front face of a motor vehicle equipped with an exchange module equipped with a ventilation device according to a third embodiment of the present invention.
Figure 14:
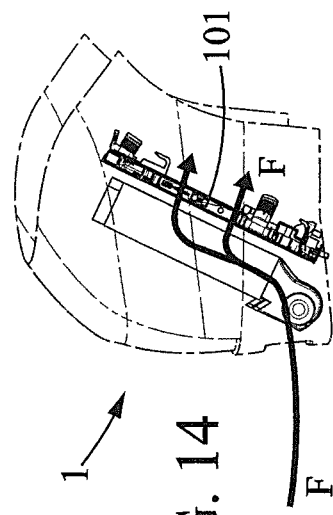
FIG. 14 is a side view of the front face of FIG. 13.

As visible in FIGS. 13 and 14, the guiding element 5 takes the form of a hood.

The ventilation device 1 illustrated also comprises at least one cross-flow turbomachine, or even two cross-flow turbomachines as depicted in FIG. 13, extending in the continuation of one another.

This embodiment is particularly advantageous for an electric vehicle.

In this case, as is evident from FIG. 13, a radiator grille 40 is pierced with an orifice 41 forming an air opening.

The two turbomachines 2 are positioned just behind the orifice 41 so that the orifice 41 forms the unique air inlet for the ventilation device 1.

Advantageously, the two turbomachines 2 occupy the entire volume of the air inlet of the radiator grille.

Note that the device 1 according to this third embodiment may also advantageously comprise deflectors 30 (not depicted in FIGS. 13 and 14) in order to achieve better uniformity of the air bound for the heat exchanger 101.

According to a variant which has not been illustrated, the at least one cross-flow turbomachine 2 is positioned some distance from the air inlet 41.

In that case, an additional component is used to convey the air from the orifice 41 as far as the turbomachine(s) 2.

At least one of the air inlets 41 may advantageously be equipped with at least one flap able to move between a position in which the inlet is open and a position in which the inlet is at least partially closed.

Exchange Module

Another subject of the invention is a heat exchange module 100 for a motor vehicle, comprising the ventilation device 1 and at least one heat exchanger 101, the ventilation device and the heat exchanger being positioned relative to one another in such a way that an air flow set in motion by the ventilation device feeds the heat exchanger with air, as is already evident from the foregoing description.

According to a variant embodiment of the module, the ventilation device 1 is positioned in such a way that an air flow F set in motion by the ventilation device is fed into the first heat exchanger 101 and the second heat exchanger 102.

The ventilation device 1 may notably be positioned between the first heat exchanger 101 and the second heat exchanger 102 so as to feed each of the exchangers 101, 102 with fresh air.

The invention is not limited to the exemplary embodiments presented, and further embodiments will be clearly apparent to a person skilled in the art. In particular, the various examples can be combined, provided they are not contradictory.

Furthermore, the embodiments depicted in the figures illustrate vertical air guiding elements with a cross-flow turbomachine mounted laterally. However, other configurations of ventilation device may be envisioned, such as an embodiment whereby the air guiding elements are horizontal, the turbomachine or turbomachines then being positioned below and/or above the guiding elements.

Moreover, the ventilation device can be integrated into an electric vehicle or equally into a combustion engine or hybrid vehicle. Thus it will be appreciated that the exchangers cooled by the ventilation device described hereinabove may be any type of motor vehicle heat exchanger, such as a high-temperature and/or low-temperature heat exchanger, a condenser, a charge air intercooler, etc. The heat exchange module may likewise comprise any heat exchanger of this type.

Figure 15:
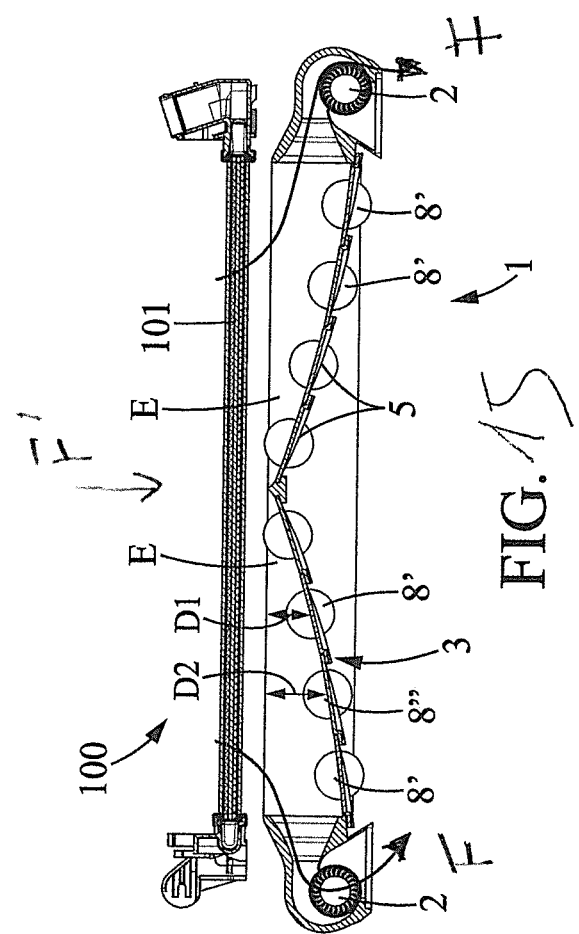
FIG. 15 is a view, similar to that of FIG. 4, according to another exemplary embodiment of the invention.

FIG. 15 depicts a view similar to that of FIG. 4, except that in the example of FIG. 15, the first heat exchanger 101 and the ventilation device 1 are positioned relative to one another in such a way that an air flow F set in motion by the ventilation device 1 is fed to the heat exchanger 101 and, when the fan is operating, this air is drawn in by the fans 2 and this drawn-in air passes first of all through the heat exchanger 101 before entering the cross-flow fans 2.

Thus, the embodiment of FIG. 4 is a blowing-fan embodiment, whereas the embodiment of FIG. 15 is a suction-fan embodiment.

In the example of FIG. 15, the fans 2 are positioned downstream of the heat exchanger 101.

FIGS. 16 and 17 depict another embodiment with the fans used as suction fans.

In this embodiment, the module has no pivoting air guiding element 5 facing the exchanger.

Thus, the module comprises air guiding elements 500 that are fixed and placed facing the exchanger 101.

Each fixed air guiding element 500, of substantially planar shape, extends facing the exchanger 101, from a geometric plane P500 centered on the exchanger 101, and as far as the associated cross-flow fan 2.

The two fixed air guiding elements 500 extend facing the exchanger, from the geometric plane P500 centered on the exchanger, and on either side of this plane P500.

Each air guiding element 500 extends as far as one of the cross-flow fans 2.

The two fixed guiding elements 500 are substantially planar, and form a non-zero angle AG between them. These elements are not aligned with respect to one another.

The angle AG between the two planes is, for example, comprised between 0° and 45°, or between 0° and 15°.

Each fixed air guiding element 500 comprises a plate 510 fixed in the module.

The plates 501 are two separate components or are produced as a single piece, for example using molding.

The module comprises a discharge duct 505 for each cross-flow fan 2, and this duct has an outlet 506 substantially downstream of the air guiding elements 500.

Each discharge duct 505 comprises an outlet wall 507 adjacent to the discharge outlet 506, which outlet wall preferably makes, geometrically, with a main face of the exchanger, an angle W, the angle W being comprised between 0° and 110°.

This orientation of the discharge notably facilitates the ejection of the air.

The respective discharge outlets 506 face one another.

Each discharge outlet 506 is positioned to the rear of the guiding element 500.

The discharge outlets 506 are symmetrical with respect to one another about a plane of symmetry, notably passing through the center of the exchanger.

The invention claimed is:

1. A heat exchange module, comprising:
   a first heat exchanger;
   a second heat exchanger extending parallel to the first heat exchanger; and
   a ventilation device configured to generate a flow of air, the ventilation device comprising at least one cross-flow fan for setting in motion an air flow and at least a first guide means and a second guide means, the first guide means and the second guide means each comprising at least one air guiding element configured to guide the air set in motion by the cross-flow fan towards the first heat exchanger and the second heat exchanger, respectively;
   wherein the ventilation device is disposed between the first heat exchanger and the second heat exchanger.

2. The device as claimed in claim 1, the ventilation device comprising a plurality of air guiding elements.

3. The device as claimed in claim 2, wherein the air guiding elements are configured to delimit at least one air passage downstream of the first heat exchanger and the second heat exchanger, and the air guiding elements are mounted with an ability to move between a position in which said at least one air passage is open and a position in which said at least one air passage is at least partially closed off.

4. The device as claimed in claim 3, wherein each air guiding element comprises an air guiding surface and a pivot axle for the guiding element.

5. The device as claimed in claim 4, wherein the pivot axles extend parallel to one another, projections of each pivot axle in a plane orthogonal to the pivot axles being referred to as projections.

6. The device as claimed in claim 2, wherein the module has no pivoting air guiding element facing the first heat exchanger and the second heat exchanger.

7. The device as claimed in claim 6, wherein the module has at least one fixed air guiding element in place facing the first heat exchanger and the second heat exchanger.

8. The device as claimed in claim 7, wherein a fixed air guiding element of substantially planar shape, extends facing the first heat exchanger, from a geometric plane centered on the first heat exchanger, as far as the cross-flow fan.

9. The device as claimed in claim 1, wherein the module comprises a discharge duct for each cross-flow fan, and this duct has an outlet substantially downstream of the air guiding element or elements.

10. The device as claimed in claim 9, wherein the discharge duct comprises an outlet wall adjacent to the discharge outlet, wherein the outlet wall makes, geometrically, with a main face of the exchanger, an angle W comprised between 0° and 110°.

11. A ventilation device for cooling at least a first heat exchanger and a second heat exchanger of an electric vehicle, comprising:

at least one cross-flow turbomachine for generating an airflow toward the first heat exchanger and the second heat exchanger; and a first guide means and a second guide means each comprising at least one air guiding element configured to guide the airflow set in motion by the cross-flow turbomachine towards the first heat exchanger and the second heat exchanger, respectively;

wherein the ventilation device is disposed between the first heat exchanger and the second heat exchanger.

* * * * *